United States Patent
Zhong (10) Patent No.: US 12,164,825 B1
(45) Date of Patent: Dec. 10, 2024

(54) METHOD AND DEVICE FOR TAKING SCREENSHOT, ELECTRONIC APPARATUS AND STORAGE MEDIUM

(71) Applicant: BEIJING XIAOMI MOBILE SOFTWARE CO., LTD., Beijing (CN)

(72) Inventor: Ming Zhong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/370,813

(22) Filed: Sep. 20, 2023

(30) Foreign Application Priority Data

Jun. 12, 2023 (CN) .......................... 202310696116.2

(51) Int. Cl.
G06F 3/14 (2006.01)
G06F 3/0354 (2013.01)
G06F 3/0488 (2022.01)

(52) U.S. Cl.
CPC ........ *G06F 3/1454* (2013.01); *G06F 3/03545* (2013.01); *G06F 3/0488* (2013.01)

(58) Field of Classification Search
CPC ... G06F 3/1454; G06F 3/03545; G06F 3/0488
See application file for complete search history.

(56) References Cited

U.S. PATENT DOCUMENTS 10,901,584 B2 * 1/2021 Wong .................. G06F 3/04886
2016/0313883 A1 * 10/2016 Zhang .................. G06F 3/04883
2019/0377476 A1 12/2019 Wong et al.

OTHER PUBLICATIONS

European Patent Application No. 23205812.3 Search and Opinion Jan. 3, 2024, 7 pages.

* cited by examiner

*Primary Examiner* — Peter D McLoone
(74) *Attorney, Agent, or Firm* — Cozen O'Connor (57) ABSTRACT

A method for taking a screenshot includes: acquiring an initial position indicated by a stylus on a screen of a terminal device at a first moment, in response to an instruction of enabling a remote screenshot function; acquiring a target position indicated by the stylus on the screen at at least one second moment after the first moment; and remotely capturing screen content corresponding to the initial position and the target position at the at least one second moment in response to a screenshot instruction, to acquire the screenshot.

20 Claims, 5 Drawing Sheets

METHOD AND DEVICE FOR TAKING SCREENSHOT, ELECTRONIC APPARATUS AND STORAGE MEDIUM

CROSS-REFERENCE TO RELATED APPLICATION

This application is based on and claims priority to Chinese Patent Application No. 202310696116.2 filed on Jun. 12, 2023, the entire content of which is incorporated herein by reference.

BACKGROUND

At present, users are increasingly accustomed to playing games and entertainment on large-screen terminal devices (such as tablets, foldable mobile phones, and laptops), to enjoy a clearer and broader display experience. Large-screen terminal devices can make users feel more immersed, but they also bring some inconvenience to the users. Usually, the large-screen terminal device is far away from a user, and if the user is only interested in a part of the screen content, a screenshot of the entire screen cannot highlight the key content that the user is most interested in, which leads to poor screenshot effect and compromised user experience.

SUMMARY

The present disclosure relates to the technical field of electronic apparatuses, in particular to a method for taking a screenshot, an electronic apparatus, and a storage medium.

Embodiments of a first aspect of the present disclosure provide a method for taking a screenshot. The method includes: acquiring an initial position indicated by a stylus on a screen of a terminal device at a first moment, in response to an instruction of enabling a remote screenshot function; acquiring a target position indicated by the stylus on the screen at at least one second moment after the first moment; and remotely capturing screen content corresponding to the initial position and the target position at the at least one second moment in response to a screenshot instruction, to acquire the screenshot.

Embodiments of a second aspect of the present disclosure provide an electronic apparatus that includes at least one processor; and a memory in communication with the at least one processor. The memory stores instructions executable by the at least one processor, and the instructions are executed by the at least one processor to allow the at least one processor to: acquire an initial position indicated by a stylus on a screen of a terminal device at a first moment, in response to an instruction of enabling a remote screenshot function; acquire a target position indicated by the stylus on the screen at at least one second moment after the first moment; and remotely capture screen content corresponding to the initial position and the target position at the at least one second moment in response to a screenshot instruction, to acquire the screenshot.

Embodiments of a third aspect of the present disclosure provide a non-instantaneous computer-readable storage medium storing computer instructions configured to allow a computer to: acquire an initial position indicated by a stylus on a screen of a terminal device at a first moment, in response to an instruction of enabling a remote screenshot function; acquire a target position indicated by the stylus on the screen at at least one second moment after the first moment; and remotely capture screen content corresponding to the initial position and the target position at the at least one second moment in response to a screenshot instruction, to acquire the screenshot.

BRIEF DESCRIPTION OF DRAWINGS

These and/or additional aspects and advantages of embodiments of the present disclosure will become apparent and more readily appreciated from the following descriptions made with reference to the drawings, in which.

DETAILED DESCRIPTION

Embodiments of the present disclosure will be described in detail below, and examples of the embodiments will be shown in the accompanying drawings, in which the same or similar elements and the elements having same or similar functions are denoted by like reference numerals. The embodiments described below are exemplary and are intended to explain the present disclosure rather than limit the present disclosure.

At present, large-screen terminal devices, such as foldable mobile phones and tablets, can provide users with a more immersive experience, and they have incomparable advantages over small-screen terminal devices in some applications. However, a larger screen means greater challenge to the users' control experience. For example, for a screenshot operation on a mobile phone, a screenshot can be taken by a power button and a volume down button, but as the screen is enlarged, the difficulty of the screenshot operation using shortcut keys increases. In the related art, screenshots are taken by finger joint swiping, which is simple and convenient, and any area of the screen can be captured, but the device has to be within the reach of the users. For a tablet device and the like, which is often equipped with a stylus, the users can realize a screenshot function by pressing a key in the stylus, which can realize remote non-contact screenshots, but cannot accurately control a screenshot area or capture part of the screen content, which is of interest. For some terminal devices with ultra-large screens, when they are used as demonstration devices during study and meeting, it is extremely inconvenient to operate if the users want to remotely take a screenshot of any area.

In view of the above problems, the present disclosure provides a method and device for taking a screenshot, an electronic apparatus, and a storage medium.

A method and device for taking a screenshot, an electronic apparatus, and a storage medium according to embodiments of the present disclosure will be described below with reference to the drawings.

Figure 1:
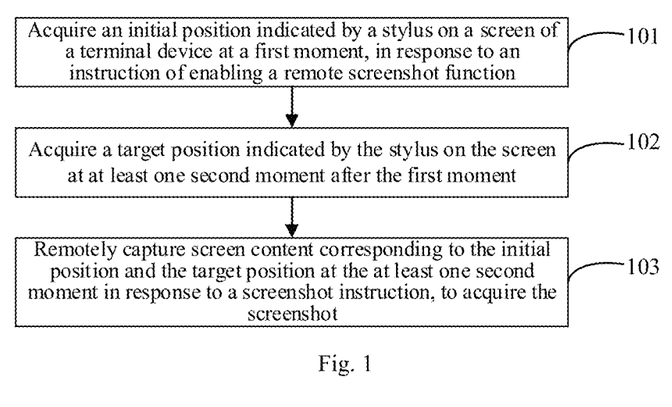
FIG. 1 is a flow chart of a method for taking a screenshot according to embodiments of the present disclosure.

FIG. 1 is a flow chart of a method for taking a screenshot according to embodiments of the present disclosure.

As shown in FIG. 1, the method includes the following steps.

In step 101, in response to an instruction of enabling a remote screenshot function, an initial position indicated by a stylus on a screen of a terminal device at a first moment is acquired.

There is a distance between the stylus and the screen of the terminal device.

The first moment is a moment when the stylus first appears on the screen of the terminal device after the remote screenshot function is enabled. Alternatively, the first moment is a moment when the remote screenshot function is enabled. Alternatively, the first moment is any moment during a set time period after the remote screenshot function is enabled, and the stylus does not move on the screen of the terminal device during the set time period.

In the embodiments of the present disclosure, when there is a distance between the stylus and the screen of the terminal device and the remote screenshot function of the terminal device is enabled, the initial position indicated by the stylus on the screen of the terminal device at the first moment can be acquired.

The remote screenshot function can be enabled by a first setting control of the stylus, or by physical keys or virtual keys on the terminal device, or through voice activation, which is not limited thereto, however.

As an example, the instruction of enabling the remote screenshot function is generated when it is detected that the first setting control in the stylus is triggered. That is, the remote screenshot function of the terminal device is enabled by triggering the first setting control of the stylus. There may be at least one first setting control.

Figure 2:
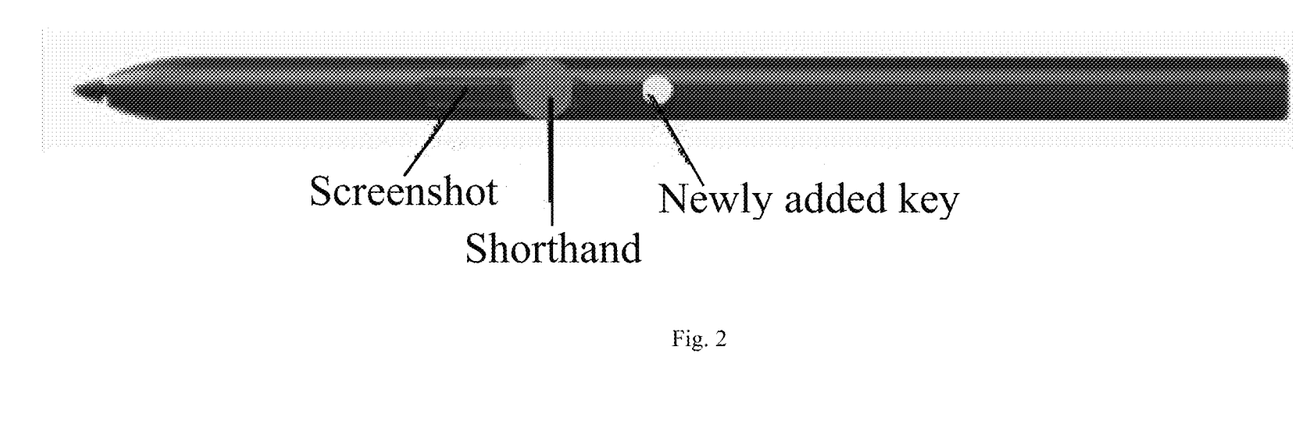
FIG. 2 is a schematic diagram of a stylus according to embodiments of the present disclosure.

For example, since the stylus itself contains two keys, the screenshot function of the terminal device can be enabled remotely using the two keys. As shown in FIG. 2, the screenshot function of the terminal device can be enabled by pressing a shorthand key first and then a screenshot key. In addition, a new key can be added to enable the remote screenshot function of the terminal device.

It should be noted that before enabling the remote screenshot function of the terminal device by the first setting control of the stylus, it is necessary to establish a communication connection between the stylus and the terminal device. In an example where the terminal device is a tablet device, when a user does not need to use the stylus, the stylus is adsorbed on the tablet device; when using the stylus, the user turns on Bluetooth of the tablet device, searches for available device, and establishes pairing and connection between the tablet device and the stylus.

The initial position may be a preset position. The initial position may be in the center of the screen or in other positions on the screen, which is not specifically limited in the present disclosure.

In step 102, a target position indicated by the stylus on the screen at at least one second moment after the first moment is acquired.

In the embodiments of the present disclosure, the target position indicated by the stylus on the screen at the at least one second moment can be acquired. It should be understood that since the stylus includes a gyroscope and an accelerometer, the target position indicated by the stylus on the screen at the at least one second moment can be calculated by the accelerometer and the gyroscope.

In step 103, in response to a screenshot instruction, screen content corresponding to the initial position and the target position at the at least one second moment is captured remotely to acquire a screenshot.

As an example, the user triggers a second setting control in the stylus, and the stylus generates a screenshot instruction and sends it to the terminal device. The terminal device receives the screenshot instruction. In response to the screenshot instruction, screen content corresponding to the initial position and the target position at the at least one second moment is captured remotely to acquire a screenshot.

As another example, the user triggers the second setting control in the stylus, and the second setting control generates instruction information and sends it to the terminal device. The terminal device generates a screenshot instruction according to the instruction information. In response to the screenshot instruction, screen content corresponding to the initial position and the target position at the at least one second moment is captured remotely to acquire a screenshot.

As still another example, a screenshot instruction is generated based on voice control, and in response to the screenshot instruction, screen content corresponding to the initial position and the target position at the at least one second moment is captured remotely to acquire a screenshot.

As yet another example, a screenshot instruction is generated when a physical key or a virtual key on the terminal device is triggered, or when it is detected that the stylus stays at a certain position longer than or equal to a set time threshold. In response to the screenshot instruction, screen content corresponding to the initial position and the target position at the at least one second moment is captured remotely to acquire a screenshot.

It should be noted that the terminal device can be controlled to save and/or display the screenshot for ease of viewing.

To sum up, the initial position indicated by the stylus on the screen of the terminal device at the first moment is acquired by responding to the instruction of enabling the remote screenshot function; the target position indicated by the stylus on the screen at the at least one second moment after the first moment is acquired; and in response to the screenshot instruction, the screen content corresponding to the initial position and the target position at the at least one second moment is remotely captured to acquire a screenshot. Consequently, by remotely capturing the screen content corresponding to the initial position indicated by the stylus on the screen at the first moment and the target position indicated by the stylus on the screen at the at least one second moment after the first moment, the screenshot of any area can be taken remotely by the stylus, which lowers the difficulty of the screenshot operation on the large-screen terminal device, avoids the problem of capturing the entire screen without highlighting the key content that the user cares about, and improves the screenshot-taking experience for the user.

To clearly explain how the screen content corresponding to the initial position and the target position at the at least one second moment is remotely captured to acquire the screenshot in response to the screenshot instruction in the above embodiments, the present disclosure provides another method for taking a screenshot.

Figure 3:
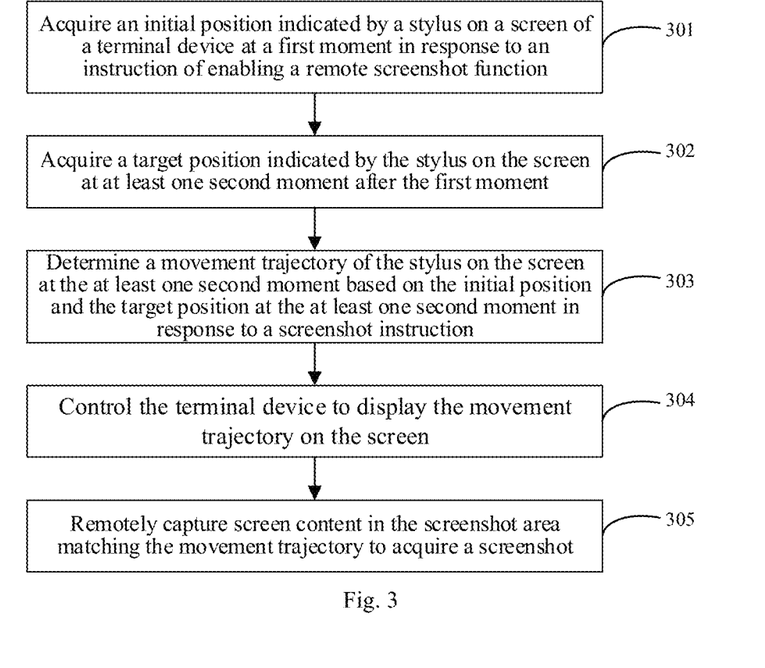
FIG. 3 is a flow chart of another method for taking a screenshot according to embodiments of the present disclosure.

FIG. 3 is a flow chart of another method for taking a screenshot according to embodiments of the present disclosure.

As shown in FIG. 3, the method includes the following steps.

In step 301, in response to an instruction of enabling a remote screenshot function, an initial position indicated by a stylus on a screen of a terminal device at a first moment is acquired.

In step 302, a target position indicated by the stylus on the screen at at least one second moment after the first moment is acquired.

In step 303, in response to a screenshot instruction, a movement trajectory of the stylus on the screen at the at least one second moment is determined based on the initial position and the target position at the at least one second moment.

As an example, according to the target position indicated by the stylus on the screen at the at least one second moment, the movement trajectory of the stylus on the screen at the at least one second moment can be determined. For example, by connecting the initial position with the target position at the at least one second moment, the movement trajectory of the stylus on the screen can be determined.

As another example, based on the initial position and the target position at the at least one second moment, a screenshot area with a set shape is generated, and screen content in the screenshot area is remotely captured. For example, a target position farthest from the initial position is determined from target positions at the at least one second moment, and a screenshot area with a set shape (such as a circle, a rectangle or an ellipse) is generated based on the target position farthest from the initial position and the initial position, in which the target position farthest from the initial position and the initial position are on the boundary of the screenshot area.

In step 304, the terminal device is controlled to display the movement trajectory on the screen.

Further, the terminal device can be controlled to display the movement trajectory on the screen.

In step 305, screen content in the screenshot area matching the movement trajectory is remotely captured to acquire a screenshot.

It should be noted that an execution process of steps 301 to 302 and step 305 can be implemented in any one of the embodiments of the present disclosure, which is not limited in the present disclosure and will not be elaborated here.

To sum up, the movement trajectory of the stylus on the screen at the at least one second moment is determined based on the initial position and the target position at the at least one second moment; the terminal device is controlled to display the movement trajectory on the screen; and the screen content in the screenshot area matching the movement trajectory is remotely captured. Consequently, by determining the movement trajectory of the stylus in the terminal device screen at the at least one second moment, the screen content in the screenshot area matching the movement trajectory is remotely captured. In such a way, the screenshot of any area can be taken remotely and accurately through the stylus, which lowers the difficulty of the screenshot operation on the large-screen terminal device, avoids the problem of capturing the entire screen without highlighting the key content that the user cares about, and improves the screenshot-taking experience for the user.

To clearly explain how to acquire the target position indicated by the stylus at the at least one second moment after the first moment in the above embodiments, the present disclosure provides another method for taking a screenshot.

Figure 4:
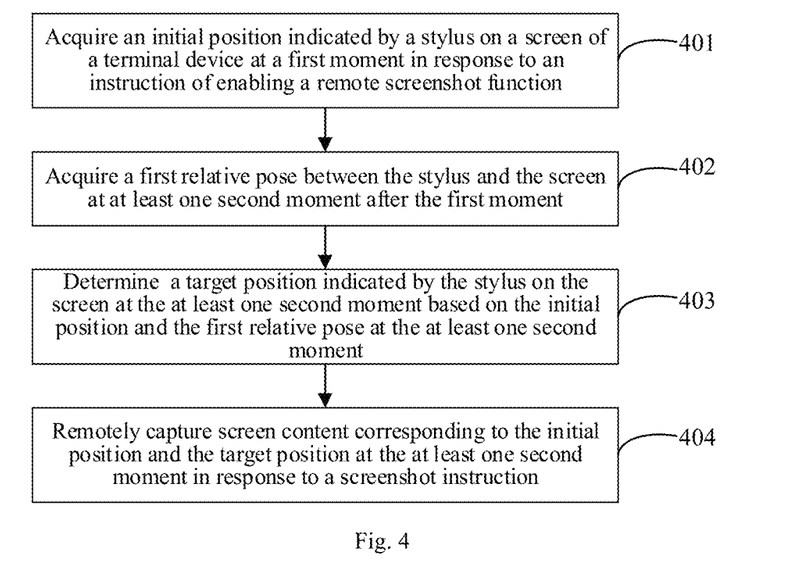
FIG. 4 is a flow chart of another method for taking a screenshot according to embodiments of the present disclosure.

FIG. 4 is a flow chart of another method for taking a screenshot according to embodiments of the present disclosure.

As shown in FIG. 4, the method includes the following steps.

In step 401, in response to an instruction of enabling a remote screenshot function, an initial position indicated by a stylus on a screen of a terminal device at a first moment is acquired.

In step 402, a first relative pose between the stylus and the screen at at least one second moment after the first moment is acquired.

As an example, a relative position between the stylus and the screen and posture information of the stylus at the at least one second moment are acquired. The relative position between the stylus and the screen and the posture information of the stylus at the at least one second moment are used as the first relative pose between the stylus and the screen of the terminal device at the at least one second moment.

For each of at least one second moment, the first relative pose at each second moment includes the relative position between the stylus and the screen and the posture information of the stylus. In the embodiments of the present disclosure, since the stylus includes the gyroscope and the accelerometer, the relative position (distance) between the stylus and the screen at the at least one second moment can be calculated through the accelerometer, and the posture information of the stylus in a spatial rectangular coordinate system can be calculated by the gyroscope. Consequently, the relative pose between the stylus and the screen at the at least one second moment can be determined according to the relative position between the stylus and the screen and the posture information at the at least one second moment, and the relative pose between the stylus and the screen at the at least one second moment can be taken as the first relative pose.

In step 403, based on the initial position and the first relative pose at the at least one second moment, a target position indicated by the stylus on the screen at the at least one second moment is determined.

As an example, a second relative pose between the stylus and the screen at the first moment is determined, and a spatial mapping relationship between the initial position and the second relative pose is established. For any of at least one second moment, the target position indicated by the stylus at any second moment on the screen is determined according to the first relative pose between the stylus and the screen at any second moment and the spatial mapping relationship.

Since the stylus includes the gyroscope and the accelerometer and the stylus is usually adsorbed on either side of the terminal device, when the user takes the stylus off either side of the terminal device and moves the stylus, the accelerometer can be used to calculate the relative position relationship between the stylus and the terminal device, and the gyroscope can be used to calculate the posture information of the stylus in the spatial rectangular coordinate system. Consequently, according to a relative position between the stylus and the screen and posture information of the stylus at the first moment, the second relative pose between the stylus and the screen at the first moment is determined, and then the spatial mapping relationship between the initial position and the second relative pose is established according to a spatial geometric algorithm. Therefore, at any of at least one second moment, the target position indicated by the stylus on the screen at any second moment can be determined according to the first relative pose between the stylus and the screen at any second moment and the spatial mapping relationship.

As another example, a second relative pose between the stylus and the screen at the first moment is determined. For any of at least one second moment, a difference between the first relative pose (between the stylus and the screen at any second moment) and the second relative pose is determined. A difference between the target position indicated by the stylus on the screen at any second moment and the initial position is determined according to a set mapping relationship and the difference between the first relative pose at any second moment and the second relative pose. According to the difference between the target position indicated by the stylus on the screen at any second moment and the initial position, and according to the initial position, the target position indicated by the stylus on the screen at any second moment is determined.

The accelerometer in the stylus is used to calculate the relative position relationship between the stylus and the terminal device, and the gyroscope in the stylus is used to calculate the posture information of the stylus in the spatial rectangular coordinate system. Consequently, the second relative pose between the stylus and the screen at the first moment can be determined according to a relative position between the stylus and the screen and posture information of the stylus at the first moment. Then, the difference between the first relative pose (between the stylus and the screen at any second moment) and the second relative pose can be determined. The difference between the target position indicated by the stylus on the screen at any second moment and the initial position can be calculated, according to the set mapping relationship and the difference between the first relative pose at any second moment and the second relative pose. Hence, the target position indicated by the stylus on the screen at any second moment can be acquired by adding the initial position and the difference between the initial position and the target position indicated by the stylus on the screen at any second moment.

In step 404, in response to a screenshot instruction, screen content corresponding to the initial position and the target position at the at least one second moment is remotely captured to acquire a screenshot.

It should be noted that an execution process of step 401 and step 404 can be implemented in any one of the embodiments of the present disclosure, which is not limited in the present disclosure and will not be elaborated here.

To sum up, by acquiring the first relative pose between the stylus and the screen at the at least one second moment after the first moment, the target position indicated by the stylus on the screen at the at least one second moment is determined based on the initial position and the first relative pose at the at least one second moment. In such a way, the target position indicated by the stylus on the screen at the at least one second moment can be accurately determined.

To clearly explain how the screen content in the screenshot area matching the movement trajectory is remotely captured in the above embodiments, the present disclosure provides another method for taking a screenshot.

Figure 5:
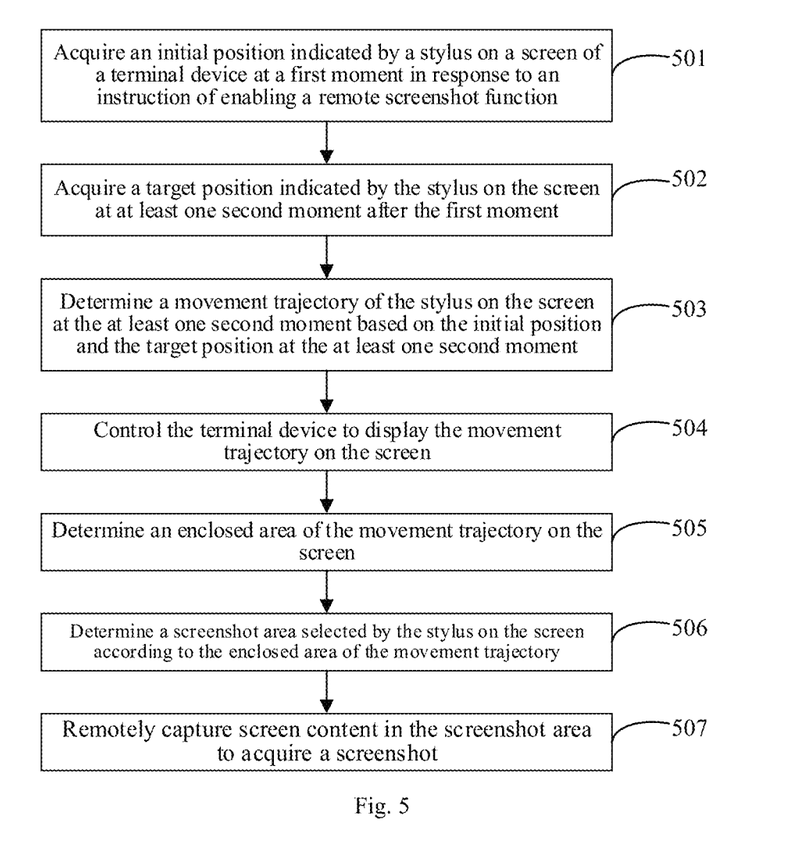
FIG. 5 is a flow chart of another method for taking a screenshot according to embodiments of the present disclosure.

FIG. 5 is a flow chart of another method for taking a screenshot according to embodiments of the present disclosure.

As shown in FIG. 5, the method includes the following steps.

In step 501, in response to an instruction of enabling a remote screenshot function, an initial position indicated by a stylus on a screen of a terminal device at a first moment is acquired.

In step 502, a target position indicated by the stylus on the screen at at least one second moment after the first moment is acquired.

In step 503, a movement trajectory of the stylus on the screen at the at least one second moment is determined based on the initial position and the target position at the at least one second moment.

In step 504, the terminal device is controlled to display the movement trajectory on the screen.

In step 505, an enclosed area of the movement trajectory on the screen is determined.

As an example, when the movement trajectory is a closed trajectory, an area enclosed by the movement trajectory can be determined and taken as the enclosed area.

As another example, when the movement trajectory is a non-closed trajectory, the movement trajectory can be completed to form a closed trajectory, and hence an area enclosed by the closed trajectory can be taken as the enclosed area of the movement trajectory on the screen.

In step 506, a screenshot area selected by the stylus on the screen is determined according to the enclosed area of the movement trajectory.

Further, the enclosed area corresponding to the movement trajectory is taken as the screenshot area selected by the stylus on the screen.

In step 507, screen content in the screenshot area is remotely captured to acquire a screenshot.

Therefore, the screen content in the screenshot area can be remotely captured to acquire the screenshot.

It should be noted that an execution process from step 501 to step 504 can be implemented in any one of the embodiments of the present disclosure, which is not limited in the present disclosure and will not be elaborated here.

To sum up, by determining the enclosed area of the movement trajectory on the screen; by determining the screenshot area selected by the stylus on the screen according to the enclosed area of the movement trajectory; and by remotely capturing the screen content in the screenshot area, the screenshot is acquired. Consequently, the screenshot area selected by the stylus on the screen can be effectively determined according to the movement trajectory, and hence the screen content in the screenshot area can be remotely captured, i.e., taking the screenshot of any area remotely, which lowers the difficulty of the screenshot operation on the large-screen terminal device, avoids the problem of capturing the entire screen without highlighting the key content that the user cares about, and improves the screenshot-taking experience for the user.

To realize the above embodiments, the present disclosure provides a device for taking a screenshot.

Figure 6:
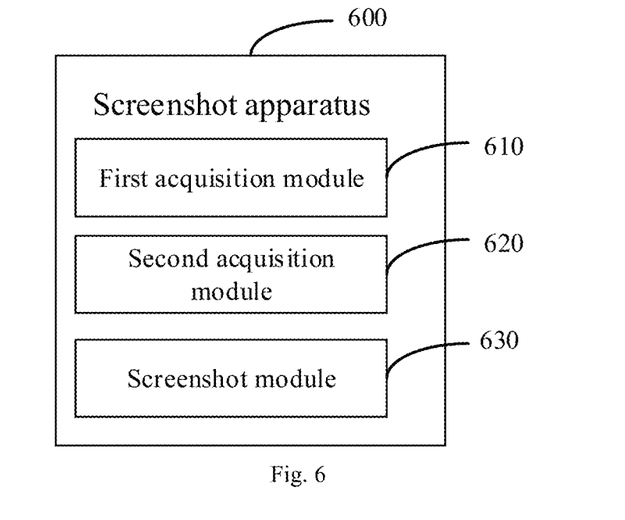
FIG. 6 is a schematic diagram of a device for taking a screenshot according to embodiments of the present disclosure.

FIG. 6 is a schematic diagram of a device for taking a screenshot according to embodiments of the present disclosure.

As shown in FIG. 6, the device 600 includes a first acquisition module 610, a second acquisition module 620, and a screenshot module 630.

The first acquisition module 610 is configured to acquire an initial position indicated by a stylus on a screen of a terminal device at a first moment, in response to an instruction of enabling a remote screenshot function. The second acquisition module 620 is configured to acquire a target position indicated by the stylus on the screen at at least one second moment after the first moment. The screenshot module 630 is configured to remotely capture screen content corresponding to the initial position and the target position at the at least one second moment in response to a screenshot instruction, so as to acquire a screenshot.

As an implementation of embodiments of the present disclosure, the screenshot module 630 is specifically configured to determine a movement trajectory of the stylus on the screen at the at least one second moment based on the initial position and the target position at the at least one second moment in response to a screenshot instruction; control the terminal device to display the movement trajectory on the screen; and remotely capture screen content in a screenshot area matching the movement trajectory to acquire the screenshot.

As an implementation of the embodiment of the present disclosure, the second acquisition module 620 is specifically configured to acquire a first relative pose between the stylus and the screen at the at least one second moment after the first moment; and determine the target position indicated by the stylus on the screen at the at least one second moment based on the initial position and the first relative pose at the at least one second moment.

As an implementation of the embodiment of the present disclosure, the second acquisition module 620 is further configured to determine a second relative pose between the stylus and the screen at the first moment; establish a spatial mapping relationship between the initial position and the second relative pose; and for any of at least one second moment, determine the target position of the stylus at any second moment on the screen according to the first relative pose between the stylus and the screen at any second moment and the spatial mapping relationship.

As an implementation of the embodiment of the present disclosure, the second acquisition module 620 is further configured to acquire a relative position between the stylus and the screen and posture information of the stylus at the at least one second moment; and take the relative position between the stylus and the screen and the posture information of the stylus at the at least one second moment as the first relative pose between the stylus and the screen at the at least one second moment.

As an implementation of the embodiment of the present disclosure, the screenshot module 630 is further configured to determine an enclosed area of the movement trajectory on the screen; determine a screenshot area selected by the stylus on the screen according to the enclosed area of the movement trajectory; and remotely capture the screen content in the screenshot area to acquire the screenshot.

As an implementation of the embodiment of the present disclosure, the instruction of enabling the remote screenshot function is generated when it is detected that a first setting control in the stylus is triggered.

As an implementation of the embodiment of the present disclosure, the screenshot instruction is generated when it is detected that a second setting control in the stylus is triggered.

As an implementation of the embodiment of the present disclosure, the device 600 further includes a determination module.

The determination module is configured to determine that a communication connection is established between the stylus and the terminal device.

As an implementation of the embodiment of the present disclosure, the device 600 further includes a control module.

The control module is configured to control the terminal device to save and/or display the screenshot.

For the device according to the embodiments of the present disclosure, the initial position indicated by the stylus on the screen of the terminal device at the first moment is acquired by responding to the instruction of enabling the remote screenshot function; the target position indicated by the stylus on the screen at the at least one second moment after the first moment is acquired; and in response to the screenshot instruction, the screen content corresponding to the initial position and the target position at the at least one second moment is remotely captured to acquire a screenshot. Consequently, by remotely capturing the screen content corresponding to the initial position indicated by the stylus on the screen at the first moment and the target position indicated by the stylus on the screen at the at least one second moment after the first moment, the screenshot of any area can be taken remotely by the stylus, which lowers the difficulty of the screenshot operation on the large-screen terminal device, avoids the problem of capturing the entire screen without highlighting the key content that the user cares about, and improves the screenshot-taking experience for the user.

It should be noted that the above explanation of the method embodiments is also applicable to the device embodiments, which will not be elaborated here.

In order to realize the above embodiments, the present disclosure also provides an electronic apparatus including at least one processor; and a memory in communication with the at least one processor. The memory stores instructions executable by the at least one processor. The instructions are executed by the at least one processor, so that the at least one processor executes the method for taking screenshots described in the above embodiments.

In order to realize the above embodiments, the present disclosure also provides a non-instantaneous computer-readable storage medium having stored therein computer instructions that are configured to cause the computer to execute the method for taking screenshots described in the above embodiments.

In order to realize the above embodiments, the present disclosure also provides a computer program product, which, when executed by an instruction processor in the computer program product, implement the method for taking screenshots described in the above embodiments.

Figure 7:
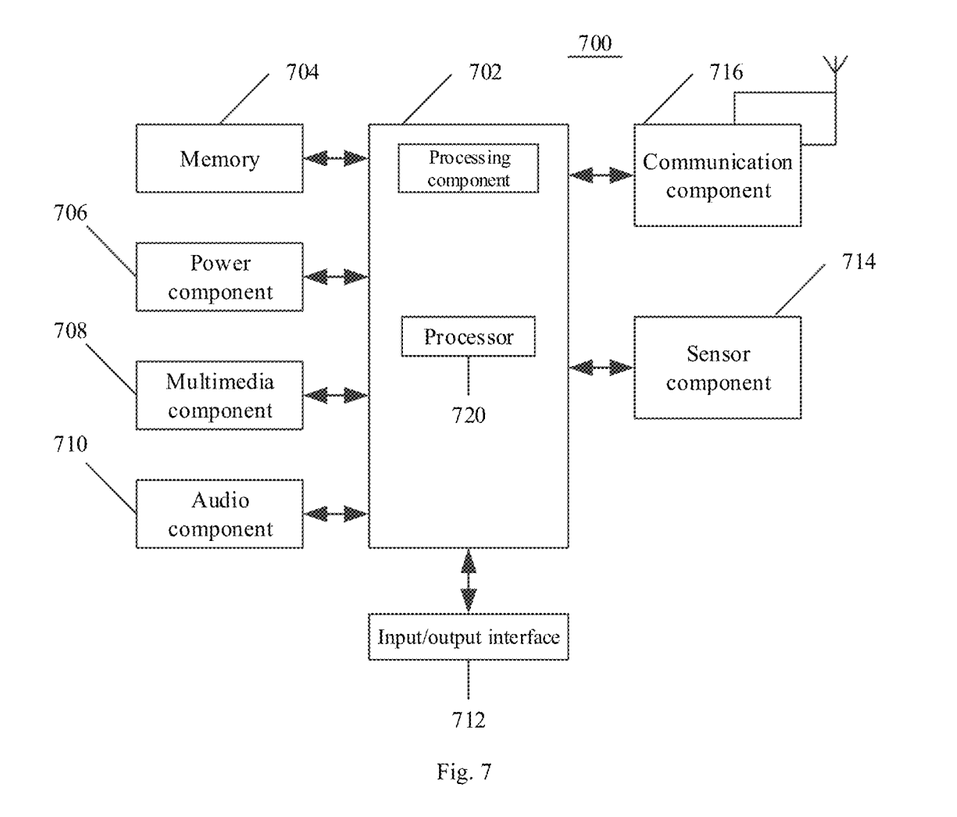
FIG. 7 is a block diagram of an electronic apparatus according to an embodiment of the present disclosure.

FIG. 7 is a block diagram of an electronic apparatus according to an embodiment. For example, the electronic apparatus 700 may be a mobile phone, a computer, a digital broadcasting terminal, a messaging device, a game console, a tablet device, a medical device, a fitness device, a personal digital assistant and the like.

Referring to FIG. 7, an electronic apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 generally controls the overall operation of the electronic apparatus 700, such as operations associated with display, telephone call, data communication, camera operation and recording operation. The processing component 702 may include one or more processors 720 to execute instructions to complete all or part of the steps of the method described above. In addition, the processing component 702 can include one or more modules to facilitate the interaction between the processing component 702 and other components. For example, the processing component 702 can include a multimedia module to facilitate interaction between the multimedia component 708 and the processing component 702.

The memory 704 is configured to store various types of data to support operations in the electronic apparatus 700. Examples of these data include instructions for any application or method operating on the electronic apparatus 700, contact data, phone book data, messages, pictures, videos, and the like. The memory 704 can be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 706 provides power to various components of the electronic apparatus 700. The power component 706 may include a power management system, one or more power sources, and other components associated with generating, managing and distributing power for the electronic apparatus 700.

The multimedia component 708 includes a screen that provides an output interface between the electronic apparatus 700 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touch, sliding and postures on the touch panel. The touch sensor may not only sense the boundary of a touch or sliding action, but also detect the duration and pressure related to the touch or sliding operation. In some embodiments, the multimedia component 708 includes a front camera and/or a rear camera. When the electronic apparatus 700 is in an operation mode, such as a shooting mode or a video mode, the front camera and/or the rear camera can receive external multimedia data. Each front camera and rear camera can be a fixed optical lens system or have focal length and optical zoom capability.

The audio component 710 is configured to output and/or input audio signals. For example, the audio component 710 includes a microphone (MIC) configured to receive external audio signals when the electronic apparatus 700 is in an operation mode, such as a call mode, a recording mode and a voice recognition mode. The received audio signal may be further stored in the memory 704 or transmitted via the communication component 716. In some embodiments, the audio component 710 further includes a speaker for outputting audio signals.

The I/O interface 712 provides an interface between processing component 702 and peripheral interface modules, such as a security keyboard, a click wheel, buttons, and the like. The buttons may include, but are not limited to, a home button, a volume button, a starting button, and a locking button.

The sensor component 714 includes one or more sensors for providing various aspects of the status assessment for the electronic apparatus 700. For example, the sensor component 714 can detect the on/off state of the electronic apparatus 700, the relative positioning of components, such as the display and keypad of the electronic apparatus 700, the position change of the electronic apparatus 700 or a component of the electronic apparatus 700, the presence or absence of contact between the user and the electronic apparatus 700, the orientation or acceleration/deceleration of the electronic apparatus 700 and the temperature change of the electronic apparatus 700. The sensor component 714 may include a proximity sensor configured to detect the presence of a nearby target without any physical contact. The sensor component 714 may also include an optical sensor, such as a CMOS or CCD image sensor, for use in imaging applications. In some embodiments, the sensor component 714 may further include an acceleration sensor, a gyro sensor, a magnetic sensor, a pressure sensor or a temperature sensor.

The communication component 716 is configured to facilitate wired or wireless communication between the electronic apparatus 700 and other devices. The electronic apparatus 700 can access a wireless network based on communication standards, such as Wi-Fi, 4G or 5G, or a combination thereof. In an embodiment, the communication component 716 receives a broadcast signal or broadcast related information from an external broadcast management system via a broadcast channel. In an embodiment, the communication component 716 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some embodiments, the electronic apparatus 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing the above-mentioned methods.

In some embodiments, there is also provided a non-transitory computer-readable storage medium including instructions, such as the memory 704 including instructions, which can be executed by the processor 720 of the electronic apparatus 700 to complete the above methods. For example, the non-transitory computer-readable storage medium can be ROM, random access memory (RAM), CD-ROM, magnetic tape, floppy disk, optical data storage device, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the above terms throughout this specification are not necessarily referring to the same embodiment or example of the present disclosure. Further, the particular features, structures, materials, or characteristics may be combined in any suitable manner in one or more embodiments or examples. Moreover, those skilled in the art can integrate and combine the different embodiments or examples and the features of the different embodiments or examples described in this specification without contradicting each other.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the term "a plurality of" means at least two, such as two or three, unless specified otherwise.

Any process or method described in a flow chart or described herein in other ways may be understood to include one or more modules, segments or portions of codes of executable instructions for achieving specific logical functions or steps in the process, and the scope of described embodiments of the present disclosure includes other implementations, in which functions can be performed in other order than as shown or discussed, including in a substantially simultaneous manner or in a reverse order according to the functions involved, which should be understood by those skilled in the technical field to which the embodiments of the present disclosure belong.

The logic and/or steps described in the flow charts or in other manners herein, for example, can be regarded as a sequencing list capable of executing instructions for implementing logical functions, and can be realized in any computer-readable storage medium to be used by instruction execution system, device, apparatus (based on systems of a computer, including the system of a processor or any other system capable of obtaining and executing instructions from the instruction execution system, device, apparatus), or the combination thereof. In terms of the present specification, "computer-readable storage medium" may be an apparatus capable of containing, storing, communicating, propagating or transmitting programs to be used by the instruction execution system, device, apparatus, or the combination thereof. Specific examples (a non-exhaustive list) of computer-readable storage media include: electrical connection pieces with one or more wirings (electronic devices), portable computer disks (magnetic devices), random-access memory (RAM), read-only memory (ROM), erasable programmable read-only memory (EPROM or flash memory), fiber devices and portable compact disc read-only memory (CDROM). In addition, computer-readable storage medium can even be paper or any other suitable medium on which the programs can be printed, because paper or other media can be, for example, optically scanned, edited, interpreted, or processed in other suitable ways when necessary, so as to obtain the programs in electronic format, and then store the programs in the computer memory.

It should be understood that each part of the present disclosure can be realized by hardware, software, firmware or the combination thereof. In the above embodiments, the plurality of steps or methods can be implemented via software or firmware stored in the memory and executed by the suitable instruction execution system. For example, if the hardware is employed, like in another embodiment, the steps or methods can be implemented by any one of the following techniques commonly known in the art, or the combination thereof: a discrete logic circuit with a logic gate circuit for achieving logic functions of data signals, an application-specific integrated circuit having a suitable mixed logic gate circuit, a programmable gate array (GPA), a field-programmable gate array (FPGA) etc.

It can be appreciated by those skilled in the art that all of or part of the steps in the embodiments can be fulfilled via corresponding hardware instructed by the programs. The programs can be stored in a computer-readable storage medium and include one of the steps or the combination thereof when executed.

In addition, each function unit in each embodiment of the present disclosure may be integrated in one processing module, or may be discrete physical individuals. Also, two or more than two units are integrated in one processing module. The integrated module can be achieved either in the form of hardware, or in the form of software function module. The integrated module can be stored in a computer-readable storage medium, when it is achieved in the form of software function module, and sold or used as an individual product.

The storage medium mentioned above may be a read-only memory, magnetic disk or optical disk, etc.

Although the embodiments of the present disclosure have been shown and described above, it can be understood that the above embodiments are merely illustrative and cannot be understood as limitations on the present disclosure. Those skilled in the art can make changes, modifications, substitutions and variations to the above embodiments within the scope of the present disclosure.

What is claimed is:

1. A method for taking a screenshot, comprising:
   acquiring an initial position indicated by a stylus on a screen of a terminal device at a first moment, in response to an instruction of enabling a remote screenshot function;
   acquiring a target position indicated by the stylus on the screen at at least one second moment after the first moment; and
   remotely capturing screen content corresponding to the initial position and the target position at the at least one second moment in response to a screenshot instruction, to acquire the screenshot,
   wherein remotely capturing the screen content corresponding to the initial position and the target position at the at least one second moment in response to the screenshot instruction to acquire the screenshot comprises:
   determining a movement trajectory of the stylus on the screen at the at least one second moment based on the initial position and the target position at the at least one second moment, in response to a screenshot instruction, wherein the movement trajectory is a closed trajectory, and an area enclosed by the movement trajectory is determined as an enclosed area on the screen.

2. The method according to claim 1, wherein remotely capturing the screen content corresponding to the initial position and the target position at the at least one second moment in response to the screenshot instruction to acquire the screenshot further comprises:
   controlling the terminal device to display the movement trajectory on the screen; and
   remotely capturing screen content in a screenshot area matching the movement trajectory to acquire the screenshot.

3. The method according to claim 2, wherein remotely capturing the screen content in the screenshot area matching the movement trajectory to acquire the screenshot comprises:
   determining the screenshot area selected by the stylus on the screen according to the enclosed area of the movement trajectory; and
   remotely capturing the screen content in the screenshot area to acquire the screenshot.

4. The method according to claim 1, wherein acquiring the target position indicated by the stylus on the screen at the at least one second moment after the first moment, comprises:
   acquiring a first relative pose between the stylus and the screen at the at least one second moment after the first moment; and
   determining the target position indicated by the stylus on the screen at the at least one second moment based on the initial position and the first relative pose at the at least one second moment.

5. The method according to claim 4, wherein determining the target position indicated by the stylus on the screen at the at least one second moment based on the initial position and the first relative pose at the at least one second moment comprises:
   determining a second relative pose between the stylus and the screen at the first moment, and establishing a spatial mapping relationship between the initial position and the second relative pose; and for any of at least one second moment, determining the target position of the stylus at any second moment on the screen according to the first relative pose between the stylus and the screen at any second moment and the spatial mapping relationship.

6. The method according to claim 4, wherein acquiring the first relative pose between the stylus and the screen at the at least one second moment after the first moment comprises:

acquiring a relative position between the stylus and the screen and posture information of the stylus at the at least one second moment; and taking the relative position between the stylus and the screen and the posture information of the stylus at the at least one second moment as the first relative pose between the stylus and the screen at the at least one second moment.

7. The method according to claim 1, wherein the instruction of enabling the remote screenshot function is generated when it is detected that a first setting control in the stylus is triggered.

8. The method according to claim 1, wherein the screenshot instruction is generated when it is detected that a second setting control in the stylus is triggered.

9. The method according to claim 1, before determining that the screenshot function of the terminal device is enabled remotely through a first setting control of the stylus, the method further comprising:

determining that a communication connection is established between the stylus and the terminal device.

10. The method according to claim 1, after remotely capturing the screen content corresponding to the initial position and the target position at the at least one second moment in response to the screenshot instruction to acquire the screenshot, the method further comprising:

controlling the terminal device to perform at least one of screenshot storage or screenshot display.

11. An electronic apparatus, comprising:

at least one processor; and a memory in communication with the at least one processor, wherein the memory stores instructions executable by the at least one processor, and the instructions are executed by the at least one processor to allow the at least one processor to:

acquire an initial position indicated by a stylus on a screen of a terminal device at a first moment, in response to an instruction of enabling a remote screenshot function;

acquire a target position indicated by the stylus on the screen at at least one second moment after the first moment; and remotely capture screen content corresponding to the initial position and the target position at the at least one second moment in response to a screenshot instruction, to acquire the screenshot, wherein the processor determines a movement trajectory of the stylus on the screen at the at least one second moment based on the initial position and the target position at the at least one second moment, in response to a screenshot instruction, wherein the movement trajectory is a closed trajectory, and an area enclosed by the movement trajectory is determined as an enclosed area on the screen.

12. The electronic apparatus according to claim 11, wherein the at least one processor is configured to:

control the terminal device to display the movement trajectory on the screen; and remotely capture screen content in a screenshot area matching the movement trajectory to acquire the screenshot.

13. The electronic apparatus according to claim 12, wherein the at least one processor is configured to:

determine the screenshot area selected by the stylus on the screen according to the enclosed area of the movement trajectory; and remotely capture the screen content in the screenshot area to acquire the screenshot.

14. The electronic apparatus according to claim 11, wherein the at least one processor is configured to:

acquire a first relative pose between the stylus and the screen at the at least one second moment after the first moment; and determine the target position indicated by the stylus on the screen at the at least one second moment based on the initial position and the first relative pose at the at least one second moment.

15. The electronic apparatus according to claim 14, wherein the at least one processor is configured to:

determine a second relative pose between the stylus and the screen at the first moment, and establishing a spatial mapping relationship between the initial position and the second relative pose; and for any of at least one second moment, determine the target position of the stylus at any second moment on the screen according to the first relative pose between the stylus and the screen at any second moment and the spatial mapping relationship.

16. The electronic apparatus according to claim 14, wherein the at least one processor is configured to:

acquire a relative position between the stylus and the screen and posture information of the stylus at the at least one second moment; and take the relative position between the stylus and the screen and the posture information of the stylus at the at least one second moment as the first relative pose between the stylus and the screen at the at least one second moment.

17. The electronic apparatus according to claim 11, wherein the instruction of enabling the remote screenshot function is generated when it is detected that a first setting control in the stylus is triggered, and the screenshot instruction is generated when it is detected that a second setting control in the stylus is triggered.

18. The electronic apparatus according to claim 11, wherein before the screenshot function of the terminal device is enabled remotely, the at least one processor is configured to determine that a communication connection is established between the stylus and the terminal device.

19. The electronic apparatus according to claim 11, wherein after the screenshot is acquired, the at least one processor is configured to control the terminal device to perform at least one of screenshot storage or screenshot display.

20. A non-transitory computer-readable storage medium storing computer instructions, wherein the computer instructions are configured to allow a computer to:

acquire an initial position indicated by a stylus on a screen of a terminal device at a first moment, in response to an instruction of enabling a remote screenshot function;

acquire a target position indicated by the stylus on the screen at at least one second moment after the first moment; and remotely capture screen content corresponding to the initial position and the target position at the at least one second moment in response to a screenshot instruction, to acquire the screenshot, wherein the computer determines a movement trajectory of the stylus on the screen at the at least one second moment based on the initial position and the target position at the at least one second moment, in response to a screenshot instruction, wherein the movement trajectory is a closed trajectory, and an area enclosed by the movement trajectory is determined as an enclosed area on the screen.

* * * * *